United States Patent
Li et al.

(10) Patent No.: US 9,794,969 B2
(45) Date of Patent: Oct. 17, 2017

(54) BEARER ALLOCATION METHOD, USER EQUIPMENT, BASE STATION, AND SERVING GATEWAY

(71) Applicant: ZTE CORPORATION, Shenzhen, Guangdong (CN)

(72) Inventors: Zhijun Li, Shenzhen (CN); Baoguo Xie, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 69 days.

(21) Appl. No.: 14/655,855

(22) PCT Filed: Nov. 6, 2013

(86) PCT No.: PCT/CN2013/086586
§ 371 (c)(1),
(2) Date: Jun. 26, 2015

(87) PCT Pub. No.: WO2014/101571
PCT Pub. Date: Jul. 3, 2014

(65) Prior Publication Data
US 2015/0359018 A1 Dec. 10, 2015

(30) Foreign Application Priority Data

Dec. 26, 2012 (CN) .......................... 2012 1 0576500

(51) Int. Cl.
*H04W 76/02* (2009.01)
*H04W 88/08* (2009.01)
(Continued)

(52) U.S. Cl.
CPC ....... *H04W 76/021* (2013.01); *H04W 76/045* (2013.01); *H04W 4/005* (2013.01);
(Continued)

(58) Field of Classification Search
CPC ... H04W 76/00; H04W 76/02; H04W 76/021; H04W 28/0252; H04W 28/00; H04W 88/08
See application file for complete search history.

(56) References Cited

U.S. PATENT DOCUMENTS 8,325,648 B1 * 12/2012 Shah ................. H04W 72/0486
370/318
8,774,818 B2 * 7/2014 Lim ...................... H04W 12/08
370/328
(Continued)

FOREIGN PATENT DOCUMENTS

CN          101051968 A      10/2007
CN          101577970 A      11/2009
(Continued)

OTHER PUBLICATIONS

Nokia, Nokia Siemens Networks, "Preservation of EPS Bearers and MME Context Parameters" S2-072747, 3GPP TSG SA WG2 Architecture—S2#58, Jun. 25-29, 2007, Orlando, Florida, 3 Pages.
(Continued)

*Primary Examiner* — Warner Wong
(74) *Attorney, Agent, or Firm* — Brooks Kushman P.C.

(57) ABSTRACT

A bearer allocation method, a User Equipment (UE), a base station, and a serving gateway are disclosed. The bearer allocation method includes: when a network entity creates a bearer for a UE, determining that the bearer has a bearer retain characteristic, and marking a bearer retain flag in bearer context information; and when the UE enters an IDLE state, an evolved base station and an SGW to which the UE belongs reserving the bearer context information marked with the bearer retain flag.

13 Claims, 9 Drawing Sheets

(51) Int. Cl.
*H04W 4/00* (2009.01)
*H04W 76/04* (2009.01)
*H04W 76/06* (2009.01)

(52) U.S. Cl.
CPC ........ *H04W 76/046* (2013.01); *H04W 76/068* (2013.01); *H04W 88/08* (2013.01)

(56) References Cited

U.S. PATENT DOCUMENTS

| | | | | |
|---|---|---|---|---|
| 2008/0194266 A1* | 8/2008 | Islam | ................... | H04W 28/18 455/450 |
| 2009/0109912 A1* | 4/2009 | DiGirolamo | .......... | H04L 5/0053 370/329 |
| 2012/0224476 A1* | 9/2012 | Jin | ........................ | H04L 5/0091 370/229 |
| 2012/0269167 A1* | 10/2012 | Velev | ................ | H04W 36/0011 370/331 |
| 2013/0051326 A1* | 2/2013 | Jeyatharan | ............ | H04L 47/245 370/328 |
| 2013/0064078 A1* | 3/2013 | Guo | ................... | H04W 76/025 370/229 |
| 2013/0080597 A1* | 3/2013 | Liao | ..................... | H04W 4/005 709/219 |
| 2013/0083765 A1 | 4/2013 | Ai | | |
| 2013/0137443 A1* | 5/2013 | Farnsworth | ......... | H04W 72/044 455/450 |
| 2013/0208699 A1* | 8/2013 | Hakkinen | ........... | H04W 76/046 370/331 |
| 2013/0215834 A1* | 8/2013 | Deivasigamani | ... | H04W 76/046 370/329 |
| 2014/0016614 A1* | 1/2014 | Velev | ................... | H04W 4/005 370/331 |
| 2014/0242970 A1* | 8/2014 | Yu | .......................... | H04W 8/02 455/419 |
| 2014/0302874 A1* | 10/2014 | Zakrzewski | ........... | H04W 8/22 455/456.1 |
| 2015/0105089 A1* | 4/2015 | Zhang | ................... | H04W 76/04 455/450 |
| 2015/0118993 A1* | 4/2015 | Rune | ..................... | H04W 12/08 455/410 |
| 2015/0173121 A1* | 6/2015 | Miklos | ................ | H04W 76/046 370/329 |
| 2015/0264739 A1* | 9/2015 | Hurtta | .................. | H04W 4/005 370/329 |

FOREIGN PATENT DOCUMENTS

| | | | | |
|---|---|---|---|---|
| CN | 102158901 A | * | 8/2011 | ............ H04W 28/06 |
| CN | 102457871 A | | 5/2012 | |
| EP | 2498566 A2 | | 9/2012 | |
| WO | 2012034580 A1 | | 3/2012 | |

OTHER PUBLICATIONS

IPWireless Inc., "On Retaining RRC Context", R2-121550, 3GPP TSG RAN WG2 Meeting #77b, Jeju, Korea, Mar. 26-30, 2012, 7 Pages.

Samsung, "A Case for Keeping the UE in Connected Mode", S2-124260, SA WG2 Meeting #94, New Orleans, USA—Nov. 12-16, 2012, 8 Pages.

Extended European Search Report Dated Nov. 26, 2015, Application No. 13867744.8-1857 2925069 PCT/CN2013086586, Applicant ZTE Corporation, 11 Pages.

PCT International Search Report Dated Feb. 27, 2014, Application No. PCT/CN2013/086586, 3 Pages.

* cited by examiner

BEARER ALLOCATION METHOD, USER EQUIPMENT, BASE STATION, AND SERVING GATEWAY

CROSS-REFERENCE TO RELATED APPLICATIONS

This application is a U.S. national Phase of PCT Application No. PCT/CN2013/086586 filed Nov. 6, 2013, which claims priority to Chinese Application No. 201210576500.0 filed Dec. 26, 2012, the disclosures of which are hereby incorporated in their entirety by reference herein.

TECHNICAL FIELD

The present document relates to the field of communications, and in particular, to a bearer allocation method, user equipment, base station, and serving gateway.

BACKGROUND OF THE RELATED ART

In the new generation of wireless communication access technologies, a User Equipment (UE for short) accesses to an Evolved Packet System (EPS for short) through an Evolved Universal Terrestrial Radio Access Network (E-UTRAN for short) base station system, and can obtain permanent online Internet Protocol (IP) service capabilities. When the UE is attached to the network, the network allocates an IP address which is continuously unchanged in an attach period to the UE. At any time in the attach period, a data request transmitted by an Application Server (AS for short) may directly use the IP to transmit downlink IP data to the UE.

FIG. 1 is a diagram of architecture of an EPS packet network to which a UE accesses through an E-UTRAN base station system, wherein the EPS packet network is comprised of a base station system and a core network system. The primary network elements of the base station system, i.e., an E-UTRAN base station system, are Evolved NodeBs (eNB for short). The core network system primarily comprises a Mobility Management Entity (MME for short), a Serving Gateway (S-GW or SGW for short), a Packet Data Network Gateway (PDN GW or P-GW or PGW for short), and a Home Subscriber Server (HSS for short). Wherein, the MME is responsible for allocating and managing user plane resources, and mapping the user plane resources to air interface resources on the eNodeB and user plane bearers on the SGW/PGW. When the UE is in an inactive state for a long time, the eNodeB will initiate a radio resource release process, i.e., releasing radio air interface bearer resources allocated to the terminal and user plane bearer resources on the S1 interface between the eNodeB and the SGW, and then the UE enters an IDLE state. When the UE wants to transmit data in an IDLE state, the eNodeB needs to interact with the MME to recover bearer resources allocated to the UE, including air interface bearer resources on the eNodeB and user plane bearer resources of the S1 interface between the eNodeB and the SGW.

FIG. 2 illustrates a bearer resource recovery process when the UE is attached to the network and then wants to initiate uplink data transfer in an IDLE state (i.e., Radio Resource Control-IDLE (RRC-IDLE)). When the UE wants to transmit data to a remote end (for example, application server) in an IDLE state, the UE must firstly set up an RRC connection to recover to a connected state. The process includes steps S201-209.

In step S201, the UE transmits an RRC Connection Request message to the eNodeB, which carries identity information of the UE, wherein, an S-Temporary Mobile Subscriber Identity (S-TMSI for short) is used here.

In an IDLE state, the UE initiates an RRC Connection Request message using a number #0 Signaling Radio Bearer (SRB for short), i.e., SRB0. The SRB0 is a shared signaling radio bearer resource, and the designed message capability per UE is very small, and is generally only used for initiating an initial RRC message and carries most necessary information elements (such as, UE identity (ID)), wherein, the ID provided by the UE is the S-TMSI here.

In step S202, after receiving the RRC connection request message, the eNodeB transmits an RRC Connection Setup message to the UE.

The message is used to indicate the UE to set up a number #1 signaling radio bearer, i.e., SRB1, which is allocated to each user, and may carry Non-Access Stratum (NAS) signaling with a certain length. After the SRB1 is allocated, the UE may initiate the NAS message using the SRB1.

In step S203, the UE transmits an RRC Connection Setup Complete message to the eNodeB. In the message, the UE carries an NAS message to be transmitted. The NAS message carried by the UE is a Service Request (SR for short) message here.

In the step, the UE transmits the NAS message using the SRB1. The SRB1 per se has certain capability limitation, and cannot be used to transmit a large NAS message. In subsequent steps, the eNodeB will indicate the UE to set up a number #2 signaling radio bearer, i.e., SRB2, and a Data Radio Bearer (DRB for short). The two radio bearers may carry an NAS message with a large capacity. The DRB is generally used to transmit IP data streams.

In step S204, after receiving an RRC connection setup complete message of the UE, the eNodeB acquires the NAS message therefrom, encapsulates the NAS message in an Initial UE Transfer message of the S1 interface, and transmits the message to the MME. All NAS messages transmitted by the UE are transparently transmitted to the MME by the eNodeB.

In step S205, after receiving the Service Request message transmitted by the UE, the MME enables the UE to enter a connected state (i.e., EPS Mobility Management-CONNECTED (EMM-CONNECTED)). At the same time, the MME transmits an Initial Context Request message to the eNodeB, which comprises a security key of the UE, EPS bearer context information, an SGW address allocated to the UE, and a radio capability of the UE etc.

In step S206, the eNodeB initiates a Security Mode Setup message to the UE, to require the UE to transmit subsequent signaling and data using an encryption method.

After the eNodeB receives the Initial UE Context Request message transmitted by the MME in step S205, the eNodeB initiates a security mode setup request to the UE using the security key in the message.

In step S207, the UE replies to the eNodeB with a Security Mode Setup Complete message, which represents that the security mode request has been received, and the security mode has been set up. Thereafter, the encryption mode is used to transmit signaling and data between the UE and the network.

In step S208, the eNodeB transmits an RRC Connection Reconfiguration Request message to the UE, which carries Radio Access Bearer (RAB for short) information.

With the RAB information, the eNodeB requires the UE to set up the indicated radio bearers, which comprise the SRB2 and a number of DRBs. These DRBs correspond to the bearers of the core network of the UE one by one.

In step S209, the UE transmits an RRC Connection Reconfiguration Complete message to the eNodeB, which indicates that the radio bearer has been configured completely.

After step S209 is performed, the UE may initiate an NAS message with a large capacity using the SRB2; and may further transmit an uplink IP data stream, the eNodeB transmits the IP data stream to the SGW corresponding to the UE, and the SGW transmits the IP data stream to the PGW.

In step S210, after receiving the RRC connection reconfiguration complete message transmitted by the UE, the eNodeB returns an Initial Context Configuration Response message to the MME.

In step S211, after receiving the Initial Context Configuration Response message transmitted by the eNodeB, the MME transmits a Modify Bearer Request message to the SGW/PGW.

In the step, the MME notifies the SGW/PGW according to the reception condition of the bearer by the UE/eNodeB to modify the bearer. The message enables the SGW to recover the bearer resources of the S1-U with the eNodeB at the same time.

In step S212, the SGW/PGW returns a Modify Bearer Response message to the MME.

After step S212, the SGW may receive the uplink IP data packet transmitted by the UE, and forwards it to the PGW.

In step S213, after the eNodeB receives the RRC request of the UE, the eNodeB sets a de-activation timer for the UE, and after the timer expires, if the UE is no longer active, a resource release process is triggered.

In step S214, if the de-activation timer of the UE on the eNodeB expires and the UE is inactive, the eNodeB initiates a UE Context Release Request message on the S1 interface to the MME.

In step S215, after receiving the UE Context Release Request message initiated by the eNodeB, the MME transmits a Release Access Bearer Request message to the SGW.

In step S216, after releasing the bearer of the S1-U interface with the eNodeB, the SGW returns a Release Access Bearer Response message to the MME.

In step S217, the MME transmits a UE Context Release Command message to the eNodeB.

In step S218, after receiving the UE Context Release Command message of the MME, if the UE is currently inaccessible, the eNodeB transmits an RRC Connection Release message to the UE, and on the other hand, the eNodeB releases the UE context information.

In step S219, the eNodeB returns a UE Context Release Complete message to the MME.

After steps S214-S219, after the UE is inactive, the eNodeB will release the radio bearers of the UE, the UE context, and the bearer context of the S1-U interface, the MME will release the UE context and enables the UE to enter an IDLE state, and the SGW will release the bearer context of the S1-U interface.

As shown in FIG. 2, in the flow of the UE entering a connected state from an IDLE state, recovering bearer resources, initiating data transfer, and finally entering an IDLE state, in order to enable the IP data to be transmitted to the SGW, the eNodeB needs to firstly find the SGW and recover the data transfer tunnel with the SGW, which needs interaction between the eNodeB and the MME and needs to obtain the bearer related information of the SGW and the S1 interface from the MME. In a case that a large number of terminals frequently initiate a small amount data transfer and rapidly enter an IDLE state after transmitting the small amount data transfer, the existing flow easily results in too much load of the network signaling, and easily results in congestion of the control network elements. On the other hand, the data traffic transmitted by these terminals is much less than the signaling traffic resulting from these terminals entering the connected state from the idle state, which results in extremely low efficiency of the system.

SUMMARY

The embodiments of the present document provide a bearer allocation method, a user equipment, a base station and a serving gateway, which can solve the problem that the load of the network signaling is large and the data processing of the system is inefficient in a scenario where a large number of terminals access to the network and frequently transmit small amount data at intervals.

The embodiments of the present document provide a bearer allocation method, comprising:

when a network entity creates a bearer for a User Equipment (UE), if it is determined that the bearer has a bearer retain characteristic, marking a bearer retain flag (BRF for short) in bearer context information; and when the UE enters an IDLE state, an evolved base station and an Serving Gateway (SGW) to which the UE belongs reserving the bearer context information marked with the bearer retain flag.

Alternatively, when any one or more of the following conditions are met, the network entity determines that the bear has a bearer retain characteristic:

an Access Point Name (APN) corresponding to the bearer is an APN which is set to support a small amount data transfer or support bearer retain;

the subscription data of the UE corresponding to the bearer marks that the UE has a small amount data transfer characteristics or has bearer retain requirements; and a bearer create request initiated by the UE carries a small amount data transfer identity or a bearer retain flag.

Alternatively, the method further comprises:

when the UE is in an IDLE state, transmitting and/or receiving Internet Protocol (IP) data using the bearer having the bearer retain flag.

Alternatively, the method further comprises:

when the UE is in an IDLE state, if the SGW receives the IP data transmitted to the UE, the SGW transmitting the IP data using the bearer having the bearer retain flag.

Alternatively, the network entity marking a bearer retain flag in bearer context information comprises:

when a Mobility Management Entity (MME) of the network entity transmits a session create request or a session change request to the SGW, the network entity carrying the bearer retain flag in the request message to indicate that a created/modified Packet Data Network (PDN) connection and Evolved Packet System (EPS) bearer have bearer retain characteristics.

Alternatively, the above method further comprises:

the SGW returning a session create response or session change response to the MME, wherein the session create response or the session change response comprises an EPS bearer list, the EPS bearer list has bearers which are marked with bearer retain identities;

the MME transmitting an initial context request or a bearer setup request to the evolved base station, wherein, the initial context request or the bearer setup request comprises a radio access bearer list, which has bearers marked with bearer retain identities; or the MME transmitting a session create request or session change request to the UE, wherein, the session create request or the session change request comprises an EPS bearer list, which has bearers marked with bearer retain identities.

Alternatively, when the UE enters an IDLE state, an evolved base station to which the UE belongs reserving the bearer context information marked with the bearer retain flag comprises:

the evolved base station reserving the context information of radio access bearers with bearer retain identities, wherein, the context information comprises a bearer identity (ID), an SGW address, and an SGW Tunnel Endpoint Identifier (TEID).

Alternatively, when the UE enters an IDLE state, an SGW to which the UE belongs reserving the bearer context information marked with the bearer retain flag comprises:

the SGW reserving the context information of EPS bearers with bearer retain identities, wherein, the context information comprises a bearer identity (ID), an evolved base station address, and an evolved base station TEID.

Alternatively, the method further comprises:

when the UE enters an IDLE state, the UE reserving the bearer context information with the bearer retain flag, wherein the context information comprises a bearer ID.

Alternatively, the reserved bearer context information further comprises a bearer Quality of Service (QoS).

Alternatively, the bearer context information reserved by the UE further comprises: SGW information and/or an evolved base station address, wherein the SGW information comprises the SGW address and the SGW TEID.

The embodiments of the present document further provide a User Equipment (UE), comprising:

a first module, configured to when the UE enters an IDLE state, reserve context information of an Evolved Packet System (EPS) bearer with a bearer retain flag, wherein, the reserved context information of the EPS bearer comprises a bearer Identity (ID); and a second module, configured to when the UE initiates a Radio Resource Control (RRC) connection in an IDLE state, carry an indication identity in an RRC connection request message, to indicate that the reserved bearer is used to transmit Internet Protocol (IP) data.

Alternatively, the reserved context information of the EPS bearer further comprises a Serving Gateway (SGW) Tunnel Endpoint Identifier (TEID) and/or evolved base station information.

Alternatively, the indication identity carried by the UE in the RRC connection request message is one or more of:

a bearer ID of the reserved bearer, an SGWTEID corresponding to the reserved bearer, and a small amount data transfer identity.

Alternatively, the UE further comprises:

a third module, configured to when the UE receives the IP data transmitted by an application program on the UE before initiating the RRC connection, judge that the reserved bearer can be used to transmit the IP data.

Alternatively, the second module is further configured to when the UE moves to a new evolved base station and initiates an RRC connection request, carry information of an old evolved base station in the RRC connection request.

The embodiments of the present document further provide a base station, comprising:

a first module, configured to when the UE enters an IDLE state, reserve context information of a radio access bearer marked with a bearer retain flag; and a second module, configured to when a Radio Resource Control (RRC) connection request which is initiated by the UE in an IDLE state is received, return radio access bearer information to the UE according to the reserved context information of the radio access bearer.

Alternatively, the second module is configured to return the radio access bearer information to the UE according to the reserved context information of the radio access bearer in the following manner:

after adding necessary information elements according to the reserved context information of the radio access bearer, returning the radio access bearer information to the UE.

The embodiments of the present document further provide a Serving Gateway (SGW), comprising:

a first module, configured to when the UE enters an IDLE state, reserve context information of an Evolved Packet System (EPS) bearer marked with a bearer retain flag; and a second module, configured to when Internet Protocol (IP) data transmitted to the UE is received, if it is determined that the reserved bearer can be used to transmit the data, transmit the IP data to the UE through a base station using the bearer.

The technical solutions according to the present application can be applied to a scenario in which a large number of terminals access to a network and frequently transmit small amount data at intervals, which can effectively reduce the signaling overhead due to recovery of bearers after the terminal enters a connected state from an IDLE state, and can reduce the consumption of the network resources, thereby improving the capability of the network load.

PREFERRED EMBODIMENTS OF THE PRESENT DOCUMENT

Figure 1:
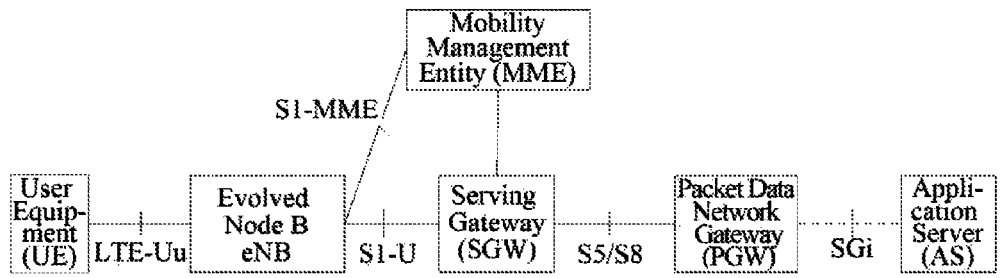
FIG. 1 is a diagram of system architecture in an E-UTRAN access scenario in the related art.

The technical schemes of the embodiments of the present document will be described in detail below in conjunction with accompanying drawings. It should be illustrated that without a conflict, the embodiments of the present application and the features in the embodiments can be combined with each other randomly.

Embodiment One

The present embodiment provides a bearer allocation method, comprising:

when a network entity creates a bearer for a UE, if it is determined that the bearer has a bearer retain characteristic, marking a bearer retain flag in bearer context information; and when the UE enters an IDLE state, an eNodeB and an SGW to which the UE belongs reserving the bearer context information marked with the bearer retain flag.

When any one or more of the following conditions are met, the network entity determines that the bear has a bearer retain characteristic:

an APN corresponding to the bearer is an APN which is set to support a small amount data transfer or support bearer retain;

the subscription data of the UE corresponding to the bearer marks that the UE has a small amount data transfer characteristic or has bearer retain requirements; and a bearer create request initiated by the UE carries a small amount data transfer identity or a bearer retain flag.

The method further comprises: when the UE is in an IDLE state, transmitting and/or receiving IP data using the bearer having the bearer retain flag; or when the UE is in an IDLE state, if the SGW receives the IP data transmitted to the UE, the SGW transmitting the IP data using the bearer having the bearer retain flag.

The network entity marking a bearer retain flag in bearer context information comprises:

when an MME of the network entity transmits a session create request or a session change request to the SGW, the network entity carrying the bearer retain flag in the request message to indicate that the created/modified PDN connection and EPS bearer have bearer retain characteristics.

The method further comprises:

the SGW returning a session create response or session change response to the MME, wherein the session create response or the session change response comprises an EPS bearer list, which has bearers which are marked with bearer retain identities;

the MME transmitting an initial context request or a bearer setup request to the evolved base station, wherein, the initial context request or the bearer setup request comprises a radio access bearer list, which has bearers marked with bearer retain identities; or the MME transmitting a session create request or session change request to the UE, wherein, the session create request or the session change request comprises an EPS bearer list, which has bearers marked with bearer retain identities.

It should be illustrated that when the UE enters an IDLE state, an evolved base station to which the UE belongs reserving the bearer context information marked with the bearer retain flag comprises: the eNodeB reserving the context information of radio access bearers with bearer retain identities, wherein, the context information at least comprises a bearer ID, an SGW address, and an SGW Tunnel Endpoint Identifier.

When the UE enters an IDLE state, an SGW to which the UE belongs reserving the bearer context information marked with the bearer retain flag comprises: the SGW reserving the context information of EPS bearers with bearer retain identities, wherein, the context information at least comprises a bearer ID, an eNodeB address, and an eNodeB Tunnel Endpoint Identifier.

When the UE enters an IDLE state, the UE reserving the bearer context information marked with the bearer retain flag comprises: the UE reserving the bearer context information marked with the bearer retain flag, wherein the context information at least comprises a bearer ID.

On the basis of the above context information, the reserved bearer context information may further comprise a QoS. Or the bearer context information reserved by the UE may further comprise: SGW information and/or an eNodeB address, wherein the SGW information comprises the SGW address and the SGW Tunnel Endpoint Identifier.

The implementation process of the above method will be described below in conjunction with accompanying drawings.

Figure 3:
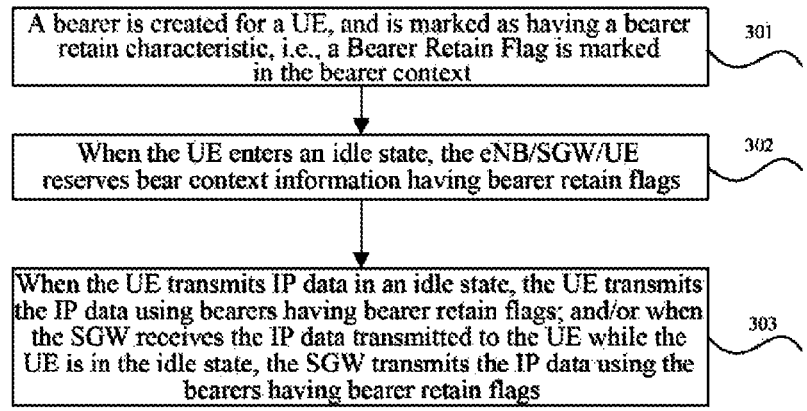
FIG. 3 is a flowchart of a bearer allocation method according to embodiment one of the present document.

The whole bearer allocation process, as shown in FIG. 3, comprises the following steps S301 to S303.

In step S301, a bearer is created for a UE, and is marked as having a bearer retain characteristic, i.e., a Bearer Retain flag is marked in the bearer context.

In the step, when the bearer is created for the UE, some bearers may be marked as having BRFs according to a number of conditions. The process may be performed according to a combination of the following conditions.

APN attribute: in the subscription data of the UE, a particular APN may be marked as supporting a small amount data transfer or as supporting bearer retain;

UE attribute: in the subscription data of the UE, the UE is marked as having a small amount data transfer characteristic, or having bearer retain requirements;

UE request: when the UE initiates a PDN connection request or a bearer create request, the UE may carry an identity to indicate that the bearer requested to be created needs to support the small amount data transfer or support the bearer retain;

According to the above combination of conditions, the MME decides whether to mark the created bearer as being required to retain, i.e., indicating bearer retain identities in the corresponding bearer context.

The MME may mark one PDN connection with a bearer retain flag, or may also mark a certain bearer (for example, a default bearer) under one PDN connection with a bearer retain flag. If one PDN connection is marked with a bearer retain flag, it is indicated that all bearers under the PDN connection may be regarded as being marked with bearer retain identities by default. Alternatively, there may be multiple bearers under one PDN connection, wherein some bearers may be marked with bearer retain identities, while other bearers are not marked with bearer retain identities.

In step S302, when the UE enters an IDLE state, the eNodeB/SGW/UE reserves context information of bearers having bearer retain identities.

In the bearer creation process, after the SGW/eNodeB/UE generates/receives a bearer list, it may be judged according to the bearer retain identities in the bearer context information that after the UE enters the idle state, some bearers need to be retained so that these bearers are retained when a corresponding process occurs, i.e., storing the bearer context information corresponding to these bearers.

The bearers stored by the SGW are EPS bearers, and the bearer context information thereof at least includes an EPSBearer ID, an eNodeB address, and an eNodeB TEID. Alternatively, the bearer context information may further include a combination of a security key, a bearer QoS etc.

The bearers stored on the eNodeB are radio access bearers, and the bearer context information thereof at least includes a RAB ID, an SGW address, and an SGW TEID. Alternatively, the bearer context information may further include a combination of a security key, a bearer QoS etc.

The bearers stored on the UE are EPS bearers, and the bearer context information thereof at least includes an EPSBearer ID. Alternatively, the bearer context information may further include a Bearer QoS etc.; and the bearer context information stored on the UE may further include the following particular information: an SGW address, an SGWTEID, and/or eNodeB information.

Alternatively, the bearers stored on the UE may further include radio access bearers, and the bearer context information thereof at least includes a RAB ID. Alternatively, the bearer context information may further include a Bearer QoS etc.

In step S303, when the UE transmits IP data in an IDLE state, the UE transmits the IP data using bearers having bearer retain identities; and/or when the SGW receives the IP data transmitted to the UE while the UE is in the idle state, the SGW transmits the IP data using the bearers having bearer retain identities.

In this step, when an application program on the UE transmits IP data transfer while the UE is in the idle state, if the UE judges that the IP data may be transmitted by using the retained bearers, the UE initiates an RRC connection to the eNodeB, and carries an identity to indicate that the retained bearer is to be used. The identity may be one or a combination of a bearer identity, an SGW address, and an SGWTEID. The information enables the eNodeB to know that the UE wants to transmit the IP data using the retained bearer, as shown in flows of FIGS. 8-10.

Figure 13:
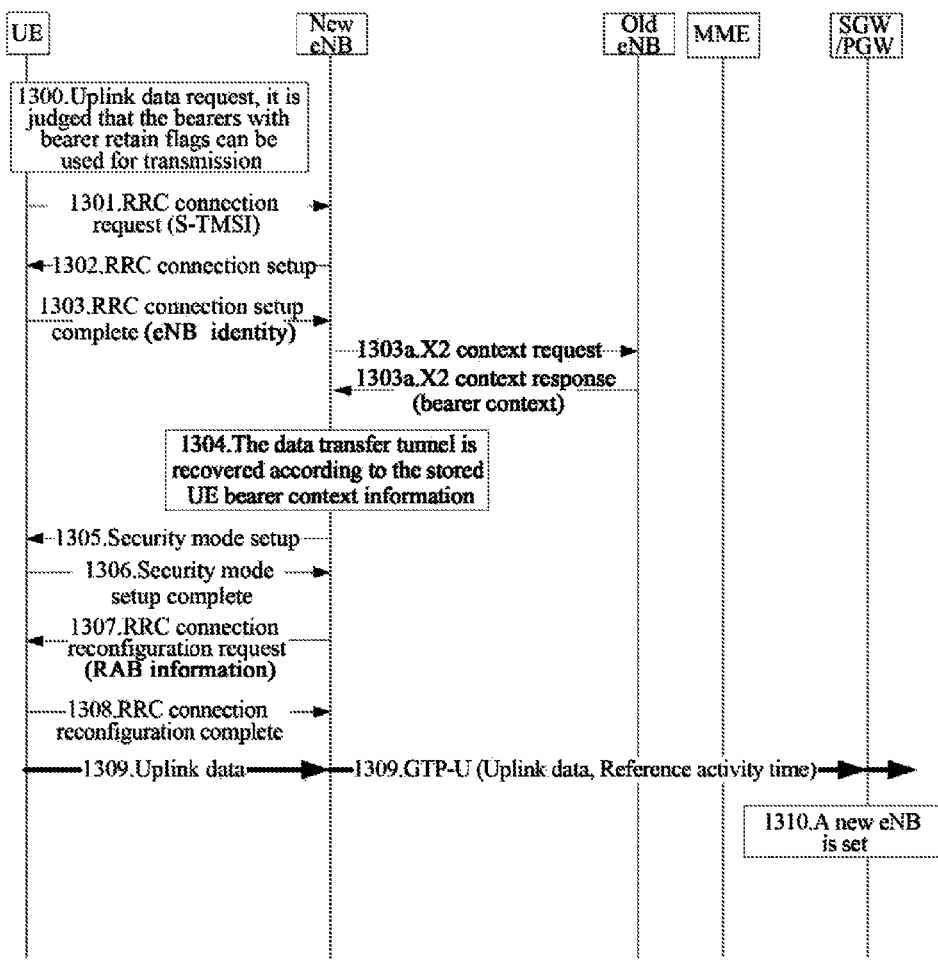
FIG. 13 is a flowchart of a UE moving to a new eNodeB and initiating uplink data transfer in an IDLE state according to an embodiment of the present document.

If the UE moves to a new eNodeB in an IDLE state, when the UE initiates an RRC connection request, the original eNodeB information may further be carried, so that the new eNodeB can obtain the retained bearer information from the original eNodeB, as shown in the flow of FIG. 13.

Figure 12:
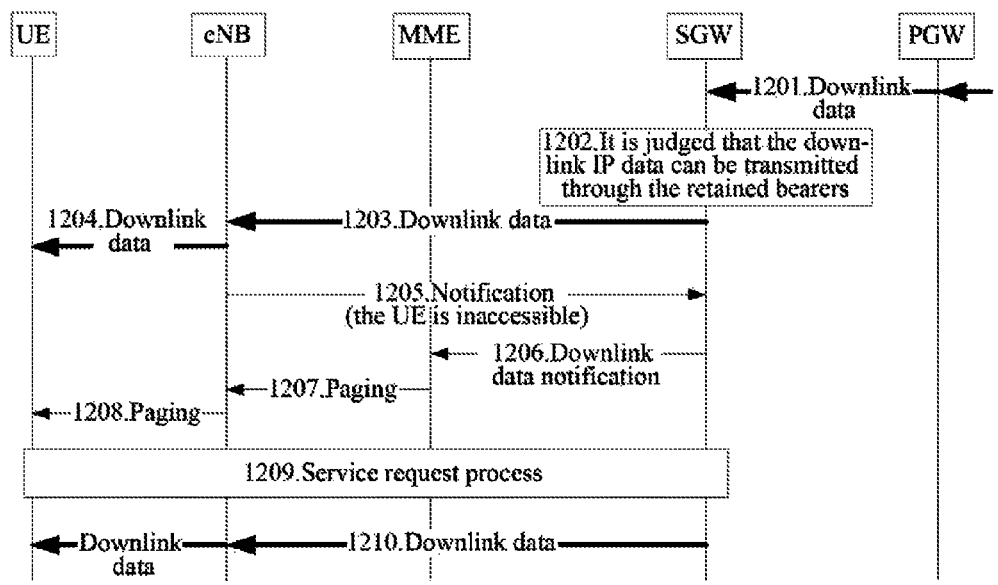
FIG. 12 is a flowchart of a UE receiving downlink IP data transfer in an IDLE state according to an embodiment of the present document.

Similarly, when the SGW receives the IP data transmitted to the UE while the UE is in an IDLE state, if it is judged that the reserved bearer can be used to transmit the IP data according to the characteristics of the IP data packet (parameters such as IPs and ports etc. of the transmitting end and the receiving end), the reserved bearer is used to transmit the IP data packet to the eNodeB, as shown in FIG. 12.

Figure 4:
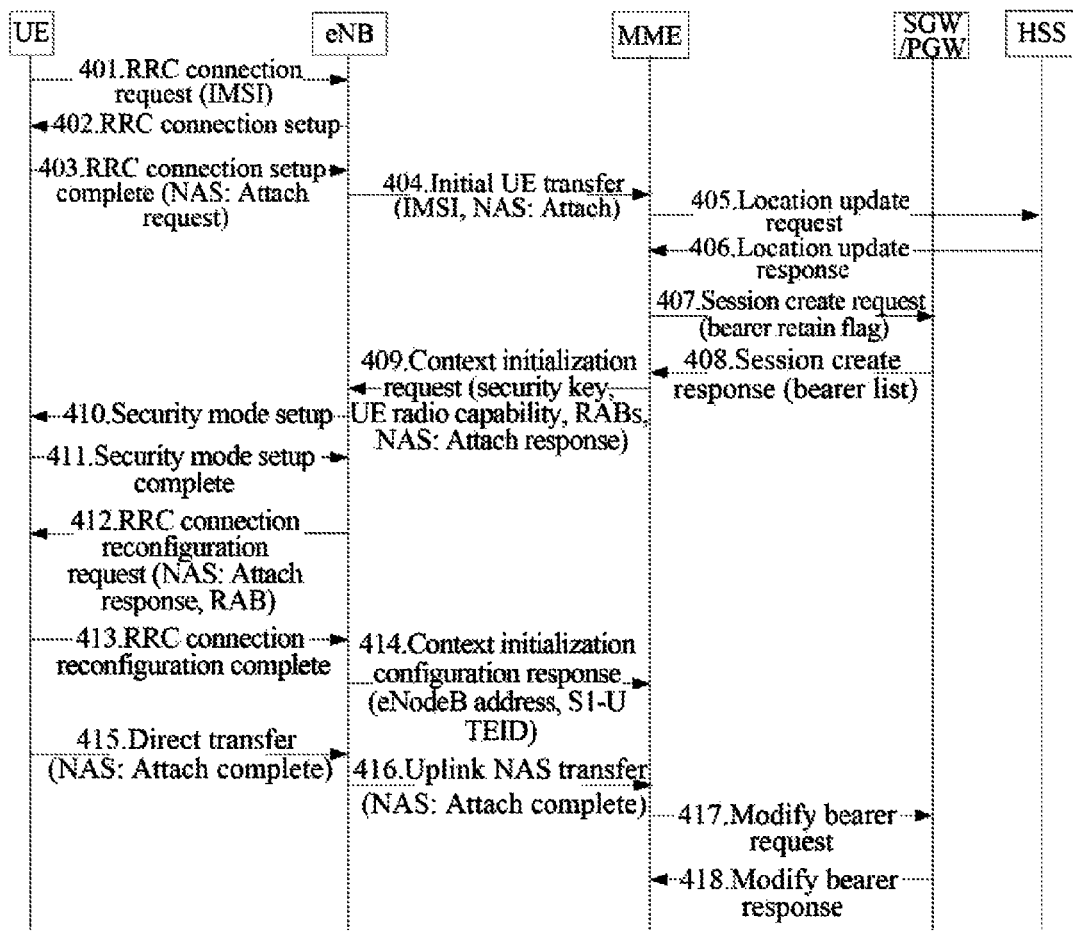
FIG. 4 is a flowchart of marking some bearers with bearer retain identities in a process that a UE is attached and creates a bearer according to an embodiment of the present document.
Figure 5:
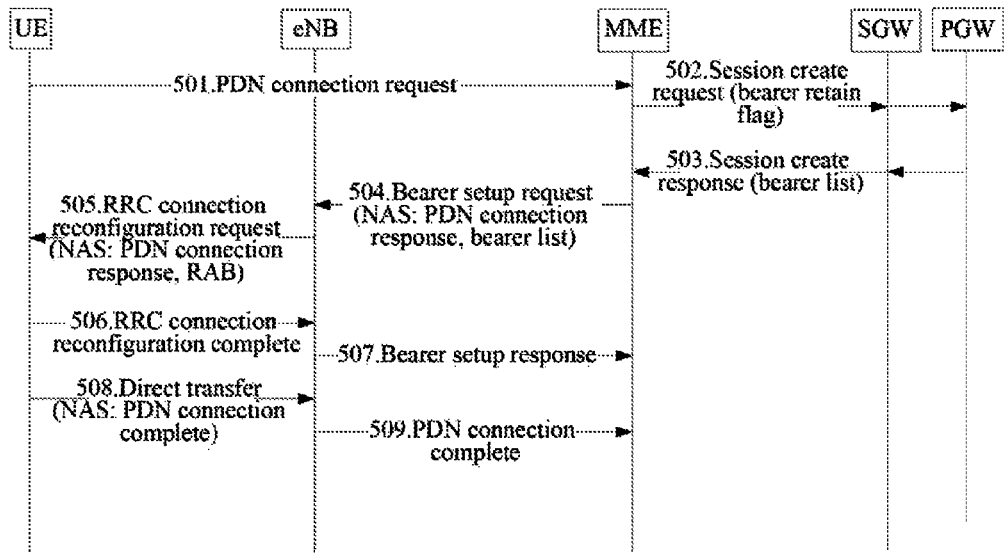
FIG. 5 is a flowchart of marking some bearers with bearer retain identities in a process of a UE requesting for creating a PDN connection according to an embodiment of the present document.
Figure 6:
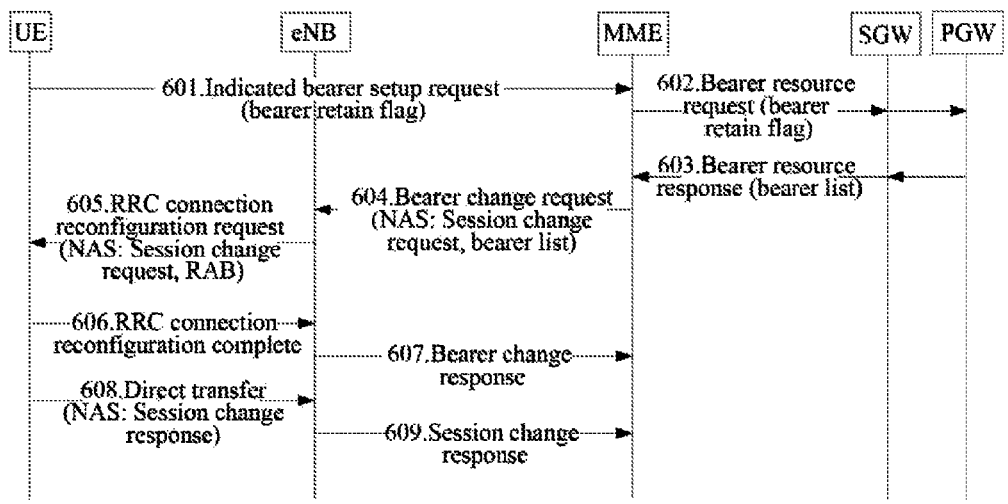
FIG. 6 is a flowchart of marking bearers with bearer retain identities in a process of a UE requesting for setting up an indicated bearer according to an embodiment of the present document.

In the above method, marking a certain bearer as a bearer retain flag may occur in the flow of the UE being initially attached and setting up a default PDN connection (the flow is shown in FIG. 4), or may occur in the flow of the UE requesting for setting up a PDN connection (the flow is shown in FIG. 5), or may occur in the flow of the UE requesting for setting up an indicated bearer (the flow is shown in FIG. 6).

The process of marking the bearer as a BRF in the flow of the UE being initially attached and setting up a default PDN connection will be described below in conjunction with FIG. 4, which comprises the following steps S401-S418.

In step S401, the UE transmits an RRC Connection Request message to the eNodeB, which carries an International Mobile Subscriber Identity (IMSI) as an identity of the UE.

In step S402, the eNodeB transmits an RRC Connection Setup message to the UE to set up a Signaling Radio Bearer 1 (SRB1).

In step S403, the UE transmits an RRC Connection Setup Complete message to the eNodeB. In this message, the UE carries an NAS message which is an Attach message.

Alternatively, according to the present scheme, if the UE is applied to a particular application scenario of a small amount data transfer, the UE may carry a small amount data transfer identity in the Attach message.

In step S404, after receiving the RRC Connection Setup Complete message of the UE, the eNodeB extracts the NAS message therefrom, which is an Attach message here, encapsulates the NAS message in an Initial UE Transfer message of the S1 interface and transmits it to the MME.

In step S405, after receiving the Attach message forwarded by the eNodeB, the MME transmits a Location Update Request message to an HSS.

In step S406, after receiving a Location Update Request message transmitted by the MME, the HSS performs registration authentication, and returns a Location Update Response message to the MME. In the message, the subscription data of the UE is returned at the same time.

After obtaining the subscription data of the UE, the MME may comprehensively judges whether the default PDN connection/default bearer is marked as having a bearer retain flag according to the characteristic setting in the subscription data and the request of the UE.

1. According to APN attributes in the subscription data: the APN may include particular attributes, such as support of the small amount data transfer, support of bearer retain etc. When the APN is not provided by the UE, the default APN indicated in the subscription is used to set up the PDN connection.

2. According to UE characteristics in the subscription data: the subscription data of the UE indicates an indication of the UE behavior mode, such as having frequent small amount data transfer characteristics, or having frequent state switching characteristics etc.

3. According to the request of the UE: when the UE initiates an Attach Request/PDN Connection Create Request/Bearer Create Request, the UE may carry a small amount data transfer identity or a bearer support identity.

Finally, the MME comprehensively judges whether the created PDN connection/(default) bearer identity is identified as having a bearer retain characteristics according to the above information. For example, Example one: if only the support of a small amount data transfer or support of bearer retain characteristics is set in the APN, the MME judges that the PDN connection/bearer may be marked with a bearer retain flag according to the APN attributes.

Example two: if the UE carries a small amount data transfer identity when the UE initiates a PDN connection request but the applied APN does not support the small amount data transfer/bearer retain, the MME judges that the PDN connection/bearer can not be marked with a bearer retain flag according to the identity carried by the UE and the APN characteristics.

In step S407, the MME transmits a Session Create Request message to the SGW/PGW, to require creating a bearer for the UE. In addition, the MME carries a bearer retain flag, to require the SGW/PGW to mark the created PDN connection and default bearers as bearer retain identities.

In step S408, the SGW/PGW creates a bearer for the UE, and marks the created PDN connection and default bearers as bearer retain identities. The SGW/PGW returns a Session Create Response message to the MME, wherein the Session Create Response includes an EPS Bearer List, which comprises PDN connection information and context information of various bearers under the PDN connection.

In step S409, the MME transmits an Initial Context Setup Request message to the eNodeB, which carries information such as a security key, a radio capability of the UE, a RAB List etc. At the same time, the MME carries an NAS message and an Attach Accept message in the message, to indicate that the attach request of the UE has been received. In the NAS message, the EPS bearer list information is included at the same time.

The RAB List transmitted by the MME to the eNodeB is generated according to an EPS Bearer List returned by the SGW/PGW to the MME, and each RAB corresponds to one EPS Bearer, and the RABs use the same Bearer ID. According to the method of the embodiments of the present document, if a certain EPS bearer is marked with a bearer retain flag, the corresponding RAB should also be marked with a bearer retain flag.

In step S410, the eNodeB initiates a Security ModeSetup message to the UE, to require the UE to transmit subsequent signaling and data using an encryption method.

In step S411, the UE replies to the eNodeB with a Security Mode Setup Complete message, which indicates that the security mode request has been received, and the security mode has been set up.

In step S412, the eNodeB transmits an RRC Connection Reconfiguration Request message to the UE which carries RAB information. In the RRC Connection Reconfiguration Request message, the eNodeB carries an NAS message and an Attach Accept message at the same time.

In step S413, the UE transmits an RRC Connection Reconfiguration Complete message to the eNodeB, which indicates that the radio bearer configuration has been completed.

In step S414, after receiving the RRC Connection Reconfiguration Complete message transmitted by the UE, the eNodeB returns an Initial Context Configuration Response message to the MME. In the message, the eNodeB carries an eNodeB address and an eNodeB TEID.

In step S415, the UE transmits a Direct Transfer message to the eNodeB, which carries an NAS message, wherein the UE carries an Attach Complete message.

In step S416, the eNodeB transmits an Uplink NAS Transfer message to the MME, which carries the Attach Complete message transmitted by the UE. In the message, the eNodeB address and the eNodeB TEID are carried.

In step S417, the MME transmits a Modify Bearer Request message to the SGW/PGW. In the message, the MME carries the eNodeB address and the eNodeB TEID to the SGW at the same time.

In step S418, the SGW/PGW returns a Modify Bearer Response message to the MME.

In addition to marking the particular bearer as a bearer retain flag when the UE is initially attached, the particular bearer may also be marked with a bearer retain flag in the flow of the UE requesting for setting up a PDN connection (as shown in FIG. 5) and in the flow of the UE requesting for setting up an indicated bearer (as shown in FIG. 6).

The process of marking the bearer as a bearer retain flag when the UE requests for a PDN connection, as shown in FIG. 5, has the similar process as that illustrated in FIG. 4, and comprises the following steps S501 to S509.

In step S501, the UE initiates a PDN connection request to the MME using a particular APN. Alternatively, the UE carries a small amount data transfer identity or a bearer retain flag.

In step S502, the MME transmits a Session Create Request to the SGW/PGW, to require creating a specified PDN connection.

In the step, as in the flow illustrated in FIG. 4, the MME judges that it needs to carry a bearer retain flag to the SGW/PGW, so that the bearer retain flag is carried in the request message.

In step S503, the SGW/PGW creates a PDN connection and a default bearer under the PDN connection, and returns a Session Create Response to the MME.

In the step, as in the flow illustrated in FIG. 4, in the bearer list returned by the SGW/PGW, the corresponding PDN connection and the default bearer are marked with bearer retain identities.

In step S504, the MME transmits a bearer setup request to the eNodeB, which carries a radio access bearer list. Wherein, the message also carries the NAS message transmitted by the MME to the UE, i.e., a PDN connection setup response message.

In step S505, the eNodeB transmits an RRC connection reconfiguration request message to the UE, to configure a newly added bearer. In addition, the message also carries the NAS message transmitted by the MME to the UE, i.e., a PDN connection setup response message.

In step S506, the UE returns an RRC connection reconfiguration complete message to the eNodeB.

In step S507, the eNodeB returns a bearer setup response message to the MME. In step S508, the UE transmits a direct transfer message to the eNodeB, wherein the message also carries the NAS message transmitted by the UE to the MME, i.e., a PDN connection setup complete message.

In step S509, the eNodeB transmits the PDN connection complete message carried by the UE to the MME.

When the UE requests to set up an indicated bearer, the process of marking bearer identity as a bearer retain flag, shown in FIG. 6, is similar to FIG. 4 and comprises the following steps S601 to S609.

In step S601, the UE requests to the MME to set up an indicated bearer. Alternatively, the UE carries a small amount data transfer identity or a bearer retain flag.

In step S602, the MME transmits a bearer resource request to the SGW/PGW to require creating a specified bearer.

In the step, as in the flow illustrated in FIG. 4, the MME judges that it needs to carry the bearer retain flag to the SGW/PGW, so that the bearer retain flag is carried in the request message.

In step S603, the SGW/PGW creates a corresponding bearer according to the request, and returns a bearer resource response to the MME.

In the step, as in the flow illustrated in FIG. 4, in the bearer list returned by the SGW/PGW, the corresponding bearer is marked with a bearer retain flag.

In step S604, the MME transmits a bearer change request to the eNodeB, which carries a radio access bearer list. Wherein, the message also carries the NAS message transmitted by the MME to the UE, i.e., a session management request message.

In step S605, the eNodeB transmits an RRC connection reconfiguration request message to the UE, to configure a newly added bearer. In addition, the message also carries the NAS message transmitted by the MME to the UE, i.e., a session management request message.

In step S606, the UE returns an RRC connection reconfiguration complete message to the eNodeB.

In step S607, the eNodeB returns a bearer change response message to the MME.

In step S608, the UE transmits a direct transfer message to the eNodeB, wherein, the message also carries the NAS message transmitted by the UE to the MME, i.e., a session management response message.

In step S609, the eNodeB transmits the session management response message carried by the UE to the MME.

With the flows illustrated in FIGS. 4-6, in the processes of the UE being attached, the UE requesting for a PDN connection, and the UE requesting for setting up a bearer, a particular PDN connection and a particular bearer may be marked with bearer retain identities. Thereby, the UE, the eNodeB, and the SGW may identify which bearers are marked with bearer retain identities according to the bearer list, and should retain these bearers to be unreleased when the UE enters an IDLE state, i.e., storing the bearer context information of these bearers.

Thereafter, when the UE initiates uplink IP data transfer while the UE is in an IDLE state and the SGW transmits downlink IP data to the UE, the retained bearers may possibly be used to directly transmit IP data, without triggering interaction flow between the eNodeB and the MME.

Figure 7:
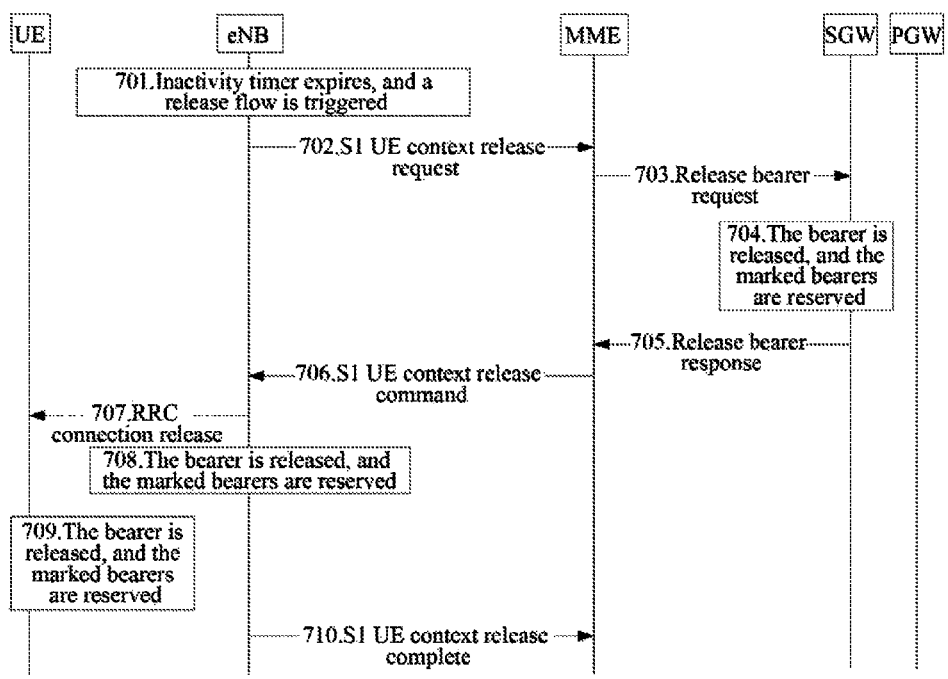
FIG. 7 is a flowchart of releasing normal bearers but reserving bearers marked with bearer retain identities in a process of a UE entering an IDLE state from a connected state according to an embodiment of the present document.

The bearer release process when the UE enters an IDLE state is shown in FIG. 7, which comprises the following steps S701 to S710, wherein, the PDN connection and bearers which are marked with bearer retain identities are not released.

In step S701, a UE inactivity timer on the eNodeB expires, and at the same time, there is no signaling and data stream transmission for the UE, and the eNodeB decides to initiate a S1 connection release process.

In step S702, the eNodeB transmits an S1 UE Context Release Request message to the MME.

In step S703, the MME transmits a Release Bearer Request message to the SGW. In the message, an indication of UE bearer context information is carried.

In step S704, after receiving the bearer release request message transmitted by the MME, the SGW performs a bearer release work. In the step, all PDN connections and EPS bearers which are marked with bearer retain identities are not released, and correspondingly, the related context information will be reserved.

The bearer context information stored on the SGW at least includes an EPS bearer ID, an eNodeB address, and an eNodeB TEID.

Alternatively, the bearer context information stored on the SGW may further comprise a Security Key and a Bearer QoS.

A flag that the UE enters an IDLE state is set by the SGW in the UE bearer context, to distinguish different scenarios of the SGW storing the UE bearer context in a connected state and selectively storing the UE bearer context in an IDLE state.

In step S705, the SGW returns a Release Bearer Response message to the MME.

In the step, the SGW marks the UE to enter an IDLE state, and stores a part of UE bearer context information, such as an eNodeB address and an eNodeB TEID.

In step S706, the MME transmits an S1 UE Context Release Command message to the eNodeB.

In step S707, if the UE is accessible, the eNodeB transmits an RRC Connection Release message to the UE, to require releasing a radio bearer of the UE.

In step S708, the eNodeB releases a radio access bearer of the UE, and reserves bearers which are marked.

If the UE is accessible, step S708 is performed after step S707, and if UE is inaccessible, step S708 may be performed after step S706. In the step, all radio access bearers which are marked with bearer retain identities are not released, and correspondingly, the related context information will be reserved.

The bearer context information stored on the eNodeB at least includes a radio access bearer ID (RAB ID, which is the same as a corresponding EPS bearer ID).

The bearer context information stored on the eNodeB may further comprise an SGW address and an SGW TEID.

Alternatively, the bearer context information stored on the eNodeB may further comprise a Security Key and a Bearer QoS.

In step S709, after receiving the RRC connection release message of the eNodeB, the UE releases the bearer information on the UE, which includes a radio access bearer and an EPS bearer.

In the step, all EPS bearers and radio access bearers which are marked with bearer retain identities are not released, and correspondingly, the related context information will be stored.

The EPS bearer context information stored on the UE at least includes an IP address allocated to the UE, and a bearer ID.

The EPS bearer context information stored on the UE may further include an SGW address and an SGW TEID.

Alternatively, the EPS bearer context information stored on the UE may further include: a Security Key and a Bearer QoS.

The radio access context information stored on the UE at least includes a radio access bearer ID (RAB ID, which is the same as a corresponding EPS bearer ID).

Alternatively, the bearer context information stored on the UE may further include: a Security Key and a Bearer QoS.

In step S710, the eNodeB returns an S1 UE Context Release Complete message to the MME.

According to the flow in FIG. 7, after the UE enters an IDLE state, bearer information (including radio access bearers, EPS bearers, PDN connections etc.) which is marked with bearer retain identities are retained on the UE, the eNodeB, and the SGW.

After the flows illustrated in FIGS. 4-7, a fast path for transmitting IP data packet which meets a condition (the judgment condition is that the bearer retained by the eNodeB/SGW meets a transmission condition of uplink/downlink IP data to be transmitted) is reserved for the UE between the eNodeB and the SGW. In the present scheme, the IP data transfer path to which the particular bearer between the eNodeB and the SGW is mapped may be referred to as a "fast path".

Figure 8:
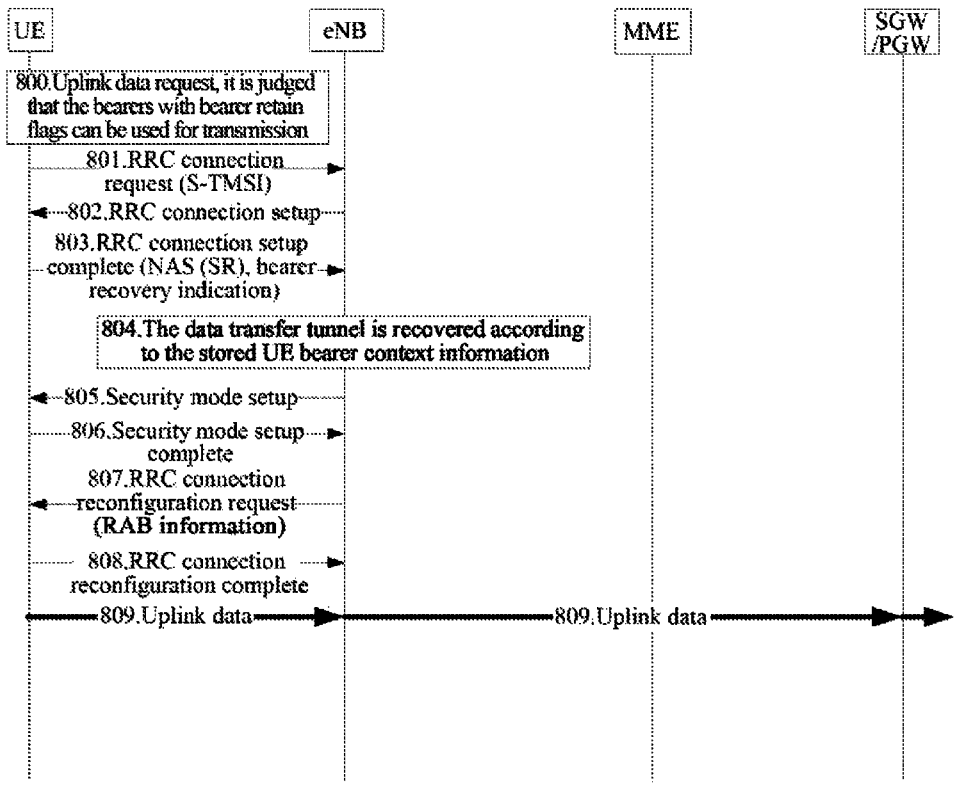
FIG. 8 is a flowchart of a UE initiating uplink data transfer in an IDLE state according to an embodiment of the present document.

FIG. 8 illustrates a flowchart of a UE initiating IP data transfer in an IDLE state, which comprises the following steps S800 to S809.

In step S800, an application program on the UE transmits IP data. As the UE is currently in an IDLE state, an RRC connection setup process is firstly triggered.

According to the IP address used by the application program to transmit IP data and other possible conditions (such as Traffic Flow Template (TFT)), the UE identifies that the IP data may be transferred currently through the bearer having a bearer retain flag which is stored by the UE at the bottom layer.

In step S801, the UE transmits an RRC Connection Request message to the eNodeB, which carries an S-TMSI of the UE.

In step S802, after receiving the RRC Connection Request message, the eNodeB transmits an RRC Connection Setup message to the UE.

In step S803, the UE transmits an RRC Connection Setup Complete message to the eNodeB.

In the message, the UE may or may not carry the NAS service request message in the RRC Connection Setup Complete message according to the related technology.

In the message, the UE carries an indication which indicates that the retained bearer is to be used to transmit IP data. The indication may be a bearer ID (for example, a radio access bearer ID, an EPS bearer ID) and/or an SGW TEID.

In step S804, after receiving the RRC Connection Setup Complete message transmitted by the UE, the eNodeB recovers the radio access bearer using the bearer context stored by the eNodeB in the above flow.

In step S805, the eNodeB initiates a Security Mode Setup message to the UE, which requires the UE to transmit subsequent signaling and data using an encryption method.

In the step, if the UE bearer context information stored by the eNodeB in the above flow includes a security key parameter, the eNodeB may directly initiate a security mode setup request to the UE using the security key parameter. Alternatively, if the eNodeB does not store the security key data when the eNodeB stores the UE bearer context information in the above flow, the eNodeB may initiate a security mode setup request to the UE using a preconfigured security key parameter.

In step S806, the UE returns a Security Mode SetupComplete message to the eNodeB.

In step S807, the eNodeB transmits an RRC Connection Reconfiguration Request message to the UE, which carries the RAB information stored in the above flow.

In the step, the eNodeB generates RAB information to be transmitted to the UE using the UE bearer context information stored in the above flow. The eNodeB may generate the RAB information according to the following method.

If the eNodeB stores the complete RAB information when the eNodeB stores the UE bearer context information in the above flow, the eNodeB transmits the RAB information to the UE; or if the eNodeB merely stores an SGW address, an SGW TEID, a UE bearer ID, and an Aggregation Maximum Bit Rate (AMBR) of the UE, the eNodeB generates the RAB information to be transmitted to the UE using the information; or if the eNodeB merely stores the SGW address and the SGW TEID, the eNodeB generates RAB information to be transmitted to the UE according to the pre-configuration strategy. For example, the eNodeB fills the bearer ID with a particular value (for example, the bearer ID is set as 0), and fills the AMBR information with a predefined bandwidth.

In step S808, the UE transmits an RRC Connection Reconfiguration Complete message to the eNodeB, which indicates that the radio bearer configuration has been completed.

In step S809, the UE transmits uplink IP data, and the eNodeB transmits the IP data to the SGW/PGW.

After step S808, the radio bearer which is required by the UE to transmit the IP data has been recovered, and the UE can initiate the uplink IP data transfer. After the eNodeB receives the IP data transmitted by the UE, the eNodeB obtains the SGW address and the SGW TEID according to the bearer context information stored by the eNodeB, recovers a data transfer tunnel with the SGW, and transmits the IP data transmitted by the UE to the SGW via the tunnel. After receiving the IP data, the SGW forwards the IP data to the PGW.

With the flow of FIG. 8, the UE, the eNodeB, and the SGW can rapidly recover the IP data transfer link, including recovering a data transfer tunnel (S1 user plane connection) between the eNodeB and the SGW and a radio bearer resource (RAB) between the eNodeB and the UE, by using the UE bearer context information stored in an IDLE state.

However, there is a defect in the flow illustrated in FIG. 8, i.e., the eNodeB, the MME and the SGW do not enable the UE enter a connected state from an IDLE state. As the eNodeB does not interact with the MME, the UE does not transmit a Service Request message to the MME, and thus, the MME cannot enable the UE to enter a connected state from an IDLE state. While the MME does not transmit any message to the SGW, and thus, the SGW does not enable the UE to enter a connected state. The UE is not enabled to enter a connected state, which may cause some faults and disadvantages to the subsequent flows.

Figure 9:
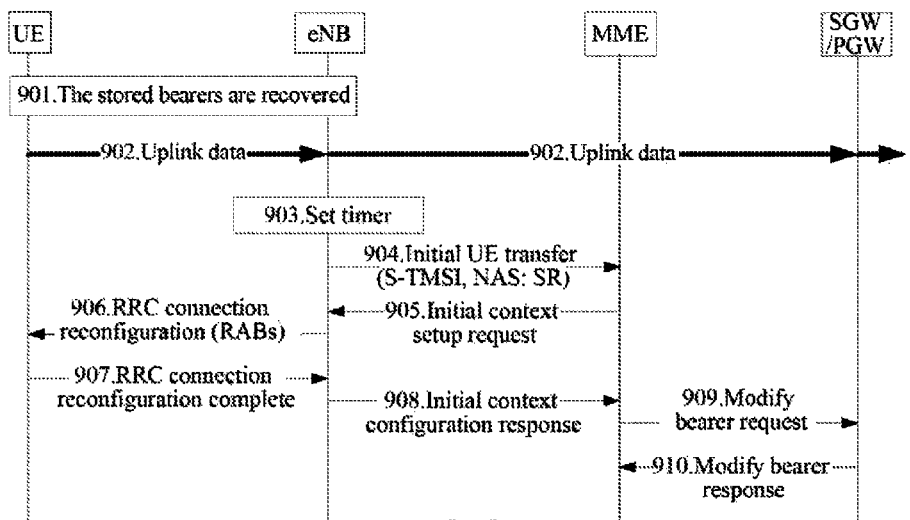
FIG. 9 is a flowchart of improvements to the flowchart in FIG. 8 according to an embodiment of the present document, wherein the UE initiates uplink data transfer in an IDLE state, and an eNodeB sets a timer to enable the UE to enter a connected state.
Figure 10:
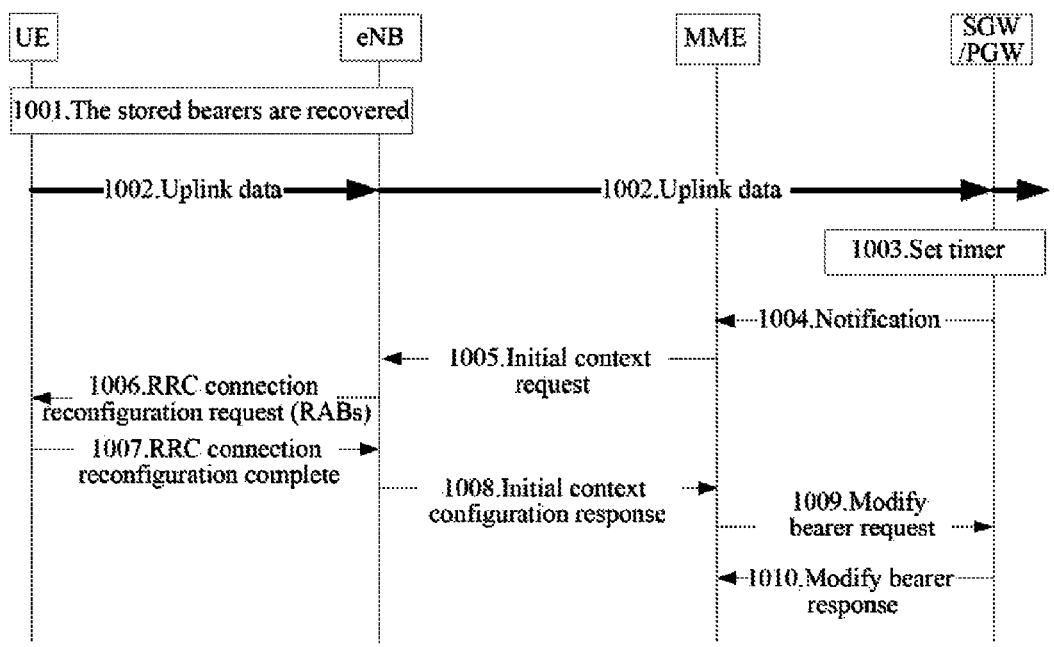
FIG. 10 is a flowchart of improvements to the flowchart in FIG. 8 according to an embodiment of the present document, wherein the UE initiates uplink data transfer in an IDLE state, and an SGW sets a timer to notify an MME to enable the UE to enter a connected state.

In order to solve the problem in the flow of FIG. 8, the methods illustrated in FIGS. 9-10 are proposed. In the flow of FIG. 9, after some time after the UE initiates an RRC connection, the eNodeB initiates interaction with the MME, to enable the UE to enter a connected state. In the flow of FIG. 10, after some time after the eNodeB transmits IP data to the SGW, the SGW interacts with the MME, to enable the MME to enter a connected state.

FIG. 9 is improvements to the flow of FIG. 8. After the UE initiates IP data in an IDLE state, the UE is enabled to enter a connected state, which comprises the following steps S901-S910.

In step S901, which is the same as S801-S808 of FIG. 8, the UE initiates an RRC connection request, and the eNodeB uses the stored UE bearer context information to indicate the UE to set up a RAB.

In step S902, the UE transmits uplink IP data.

In step S903, after the step S901 or S902, the eNodeB sets an activity setting timer for the UE.

In the step, the function of the eNodeB setting the activity setting timer is to monitor the durability of the activity of the UE after the UE initiates an RRC connection or the UE initiates uplink IP data, so as to decide whether to enable the UE to enter a connected state. For example, if the UE initiates an RRC connection only for transmission of a few IP data, and then enters a silent period after the transmission is completed, there is no need to enable the UE to enter a connected state, i.e., there is no need to trigger interaction between the eNodeB and the MME. If the UE has continuous activity in the period of the timer, for example, there are many IP data transfer actions, the UE is enabled to enter a connected state.

In step S904, after the activity setting timer expires, if the eNodeB judges that the UE should be enabled to enter a connected state, the eNodeB transmits an Initial UE Transfer message to the MME, which carries an NAS Service Request message.

If the UE carries the NAS service request message in the above RRC connection request setup complete message, the eNodeB should buffer the NAS service request message. Alternatively, if the UE does not carry the NAS service request message in the above message, the eNodeB initiates the NAS service request message to the MME in replace of the UE.

In step S905, after receiving the Service Request message transmitted by the UE, the MME enables the UE to switch to a connected state. At the same time, the MME transmits an Initial Context Request message to the eNodeB, which contains a security key of the UE, EPS bearer context information, an SGW address allocated to the UE, and a radio capability of the UE etc.

In step S906, after receiving the Initial Context Request message transmitted by the MME, the eNodeB transmits an RRC Connection Reconfiguration Request message to the UE, to require the UE to reconfigure a radio access bearer RAB.

In step S907, the UE performs radio access bearer configuration, and returns an RRC Connection Reconfiguration Complete message to the eNodeB.

In step S908, the eNodeB returns an InitialContext Configuration Response message to the MME.

In the step, the eNodeB deletes the flag that the stored UE is in an IDLE state, i.e., indicating that the UE is currently in a connected state.

In step S909, after receiving an initial context configuration response message transmitted by the eNodeB, the MME transmits a Modify Bearer Request message to the SGW/PGW.

In the step, the SGW deletes the flag that the stored UE is in an IDLE state, i.e., indicating that the UE is currently in a connected state.

In step S910, the SGW/PGW returns a Modify Bearer Response message to the MME.

After steps S906-S910, the UE is enabled to enter a connected state, and the MME transmits all bearer context information to the eNodeB and the SGW, to enable the bearers on the UE, the eNodeB and the SGW to recover to a normal state, i.e., a connected state.

FIG. 10 is improvements to the flow of FIG. 8. After the UE initiates IP data in an IDLE state, the UE is enabled to enter a connected state, which comprises the following steps S1001-S1010.

In step S1001, which is the same as S810-S808 of FIG. 8, the UE initiates an RRC connection request, and the eNodeB uses the stored UE bearer context information to indicate the UE to set up a RAB.

In step S1002, the UE transmits uplink IP data.

In step S1003, after the step S1002, after receiving the uplink IP data of the UE, the SGW sets an activity setting timer for the UE.

In the step, the function of the SGW setting the activity setting timer is to monitor the durability of the activity of the UE after the UE initiates uplink IP data, so as to decide whether to enable the UE to enter a connected state. For example, if the UE initiates an RRC connection only for transmission of a few IP data, and then enters a silent period after the transmission is completed, there is no need to enable the UE to enter a connected state, i.e., there is no need to trigger interaction between the SGW and the MME. If the UE has continuous activity in the period of the timer, for example, there are many IP data transfer actions, the UE is enabled to enter a connected state.

In step S1004, after the activity setting timer expires, the SGW transmits a Notification message to the MME, to notify the UE to enter an active state.

In step S1005, the MME transmits an Initial Context Request message to the eNodeB, to set the UE context information.

In step S1006, after receiving the Initial Context Request message transmitted by the MME, the eNodeB transmits an RRC Connection Reconfiguration Request message to the UE, to require the UE to reconfigure a RAB.

In step S1007, the UE performs radio access bearer configuration, and returns an RRC Connection Reconfiguration Complete message to the eNodeB.

In step S1008, the eNodeB returns an Initial Context Configuration Response message to the MME.

In the step, the eNodeB deletes the flag that the stored UE is in an IDLE state, i.e., indicating that the UE is currently in a connected state.

In step S1009, after receiving an initial context configuration response message transmitted by the eNodeB, the MME transmits a Modify Bearer Request message to the SGW/PGW.

In the step, the SGW deletes the flag that the stored UE is in an IDLE state, i.e., indicating that the UE is currently in a connected state.

In step S1010, the SGW/PGW returns a Modify Bearer Response message to the MME.

With the flows of FIGS. 9-10, the eNodeB, the SGW and the MME may enable the UE to enter a connected state from an IDLE state.

In the flows illustrated in FIGS. 8-10, after the UE initiates an activity (initiates an RRC connection, initiates uplink IP data transfer), if the UE has not enter a connected state, it may assume that the UE is still in the same eNodeB in a certain period of time, while the SGW may use the retained bearer to transmit the downlink IP data to the eNodeB. According to the idea, a "fast path retain timer" may be set on the SGW, and when the SGW receives the uplink IP data transmitted by the eNodeB, the "fast path retain timer" is started.

Figure 11:
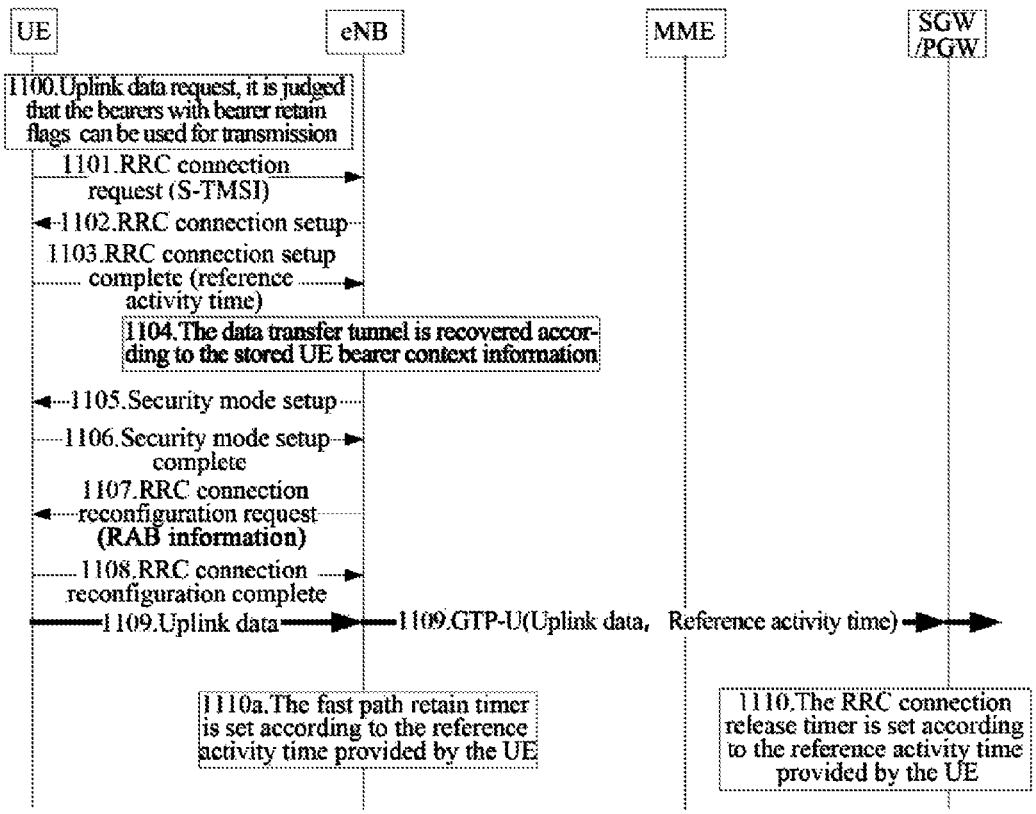
FIG. 11 is a flowchart of improvements to the flowchart in FIG. 8 according to an embodiment of the present document, wherein when the UE initiates an RRC connection/uplink IP data transfer, an eNodeB/SGW sets a fast path retain timer.

The set value of the "fast path retain timer" may be obtained by the following several methods:

the SGW sets the value according to a local strategy;

the value is provided by the MME, for example, in the step S407 of flow 4, when the MME transmits a Session Create Request to the SGW/PGW, a value of the "fast path retain timer" is carried; or the value is provided by the UE, for example, when the UE initiates an RRC connection or initiates IP data transfer, the UE carries a reference activity time, while the eNodeB adjusts the RRC connection release timer according to the reference activity time, and the SGW adjusts the "fast path retain timer" according to the reference activity time, as shown in FIG. 11.

FIG. 11 is a flowchart of a UE providing a reference activity time, an eNodeB setting an RRC connection release timer, and an SGW setting a "fast path activity timer"

according to an embodiment of the present document. Compared with the flow illustrated in FIG. 4, the flow of the present example has the following improved steps.

In step S1103, when the UE transmits an RRC connection complete message to the eNodeB, the UE provides a reference activity time value.

In step S1109, when the eNodeB transmits uplink IP data of the UE to the SGW, the reference activity time is additionally carried in a General Packet Radio Service (GPRS) TunnellingProtocol for Userplane (GTP-U) data packet.

In step S1110a, after the UE initiates an RRC connection or the UE initiates uplink IP data, the eNodeB adjusts the RRC connection release timer according to the reference activity time.

In step S1110b, after receiving the uplink IP data of the UE transmitted by the eNodeB, the SGW starts a "fast path retain timer", and adjusts the value of the "fast path retain timer" from the reference activity time provided by the UE which is received by the eNodeB.

FIG. 12 is a flowchart of transmitting downlink IP data using the retained bearer when an SGW/PGW receives downlink IP data transmitted to the UE while the UE is in an IDLE state according to an embodiment of the present document, which comprises the following steps S1201-S1210.

In step S1201, the PGW receives the downlink IP data and transmits it to the SGW.

In step S1202, according to the existing condition, if the SGW judges that the downlink IP data may be transmitted using the retained bearers, steps S1203-S1204 will be performed, and if the SGW judges that the downlink IP data cannot be transmitted using the retained bearers, steps S1206-S1210 will be performed.

In the step, the SGW may comprehensively judge whether a downlink IP data packet can be transmitted to the UE using the retained bearers in the above flow based on the following conditions:

according to the IP addresses and ports etc. of the transmitting end and the receiving end of the downlink IP data; and according to whether the UE is in an IDLE state; and according to the current "fast path retain timer" is activated;

In step S1203, the SGW transmits the downlink IP data to the eNodeB using the retained bearer context information;

In step S1204, if the UE is currently accessible, the eNodeB transmits the downlink IP data to the UE. If the UE is currently inaccessible, the eNodeB performs step S1205.

In step S1205, the UE is currently inaccessible, and the eNodeB transmits a notification to the SGW, to notify that the UE is currently inaccessible. After the SGW receives the notification of the eNodeB, the SGW performs step S1206, to trigger the downlink IP data transfer process of steps S1206-S1210.

In step S1206, the SGW transmits a Downlink Data Notification message to the MME.

In steps S1207-S1208, the MME transmits a Paging message to the eNodeB, and the eNodeB pages the UE.

In step S1209, after receiving the paging, the UE initiates a Service Request process, and the flow is shown in FIGS. 8-10.

In step S1210, after the UE responds to the paging, the SGW transmits the IP data to the UE.

The flows of FIGS. 8-12 may be used to a scenario that the UE resides under the same eNodeB. If the UE moves between eNodeBs, the "fast path" between the SGW and the original eNodeB does not exist. At this time, if the UE wants to initiate uplink IP data transfer, the new eNodeB needs to perform the existing RRC connection setup and S1 interaction process, and the prioritization in the embodiment of the present document will not embody the effect. In order to solve the problem that the UE moves between different eNodeBs, the embodiment of the present document proposes another method, so that when the UE initiates RRC connection setup to a new eNodeB, the new eNodeB can obtain bearer context information which is previously stored for the UE from the old eNodeB, so that the "fast path" of the IP data transfer between the eNodeB and the SGW according to the embodiment of the present document can continue to be used.

FIG. 13 is a flowchart of a new eNodeB interacting data with an old eNodeB to complete uplink data transfer when a UE initiates an RRC connection to the new eNodeB and transmits IP data according to an embodiment of the present document. Compared with the flows illustrated in FIGS. 8-11, the flow according to the embodiment has the following improved steps.

Steps S1300-S1302 are the same as steps S800-S802 in FIG. 8.

In step S1303, the UE transmits an RRC connection complete message to a new eNodeB. On the basis of the above method, the UE further carries information of the old eNodeB (an eNodeB ID, an eNodeB address).

In step S1303a, after the new eNodeB obtains the information of the old eNodeB, if there is an X2 interface between the new eNodeB and the old eNodeB, the new eNodeB initiates a user context request message of the X2 interface to the old eNodeB.

Figure 2:
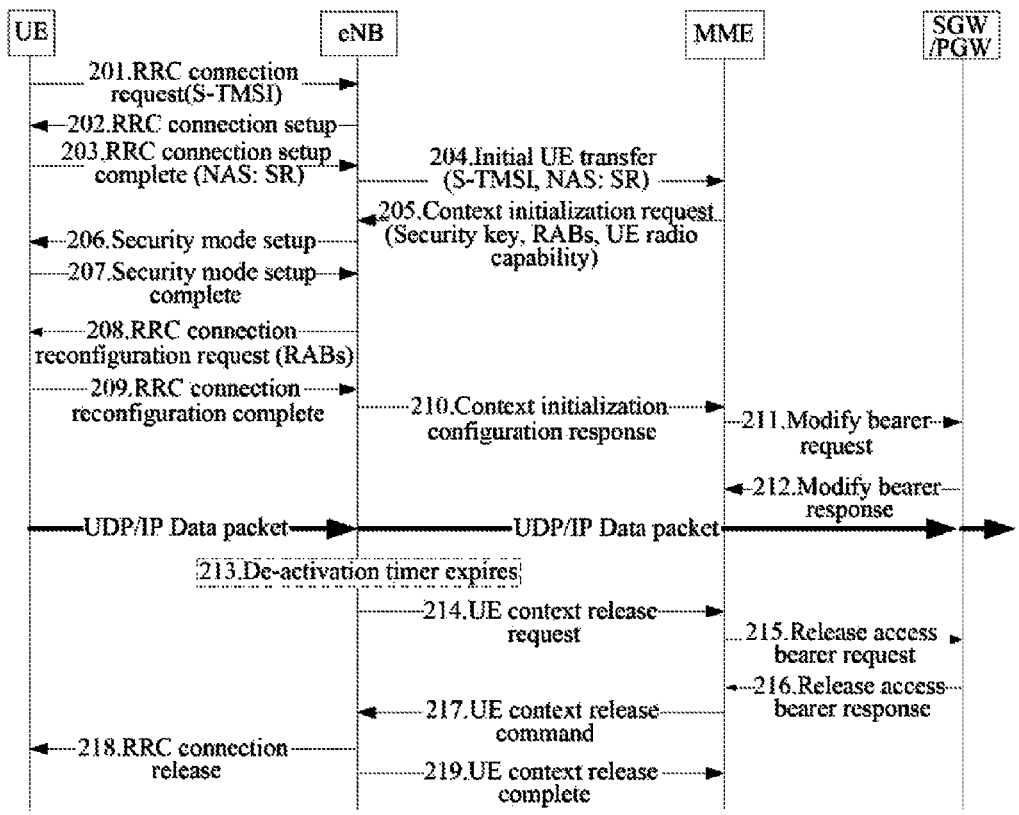
FIG. 2 is a flowchart of a UE initiating data transfer after entering a connected state from an IDLE state and entering the idle state after the data transfer is completed in the related art.

In the step, if the new eNodeB does not obtain the information of the old eNodeB, the new eNodeB initiates RRC connection setup and S1 interaction flow according to the related technologies, i.e., performs a flow illustrated in FIG. 2.

In step S1303b, the old eNodeB transmits bearer context information stored for the UE to the new eNodeB. The information enables the new eNodeB to be the same as the old eNodeB. The uplink IP data is rapidly transmitted according to the flows illustrated in FIGS. 8-11.

Steps S1304-S1309 are the same as steps S804-S809 in FIG. 8.

In step S1310, after receiving the uplink IP data transmitted by the new eNodeB, the SGW replaces the address of the old eNodeB stored on the SGW with the address of the new eNodeB.

Embodiment Two

Figure 14:
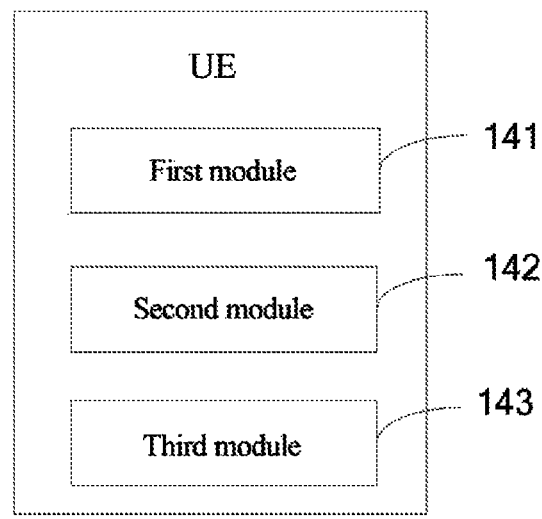
FIG. 14 is a structural diagram of a user equipment according to embodiment two of the present document.

The present embodiment provides a UE, and as shown in FIG. 14, the UE at least includes a first module 141 and a second module 142.

The first module 141 is configured to when the UE enters an IDLE state, reserve context information of a radio access bearer marked with a bearer retain flag, wherein, the reserved context information of the EPS bearer at least includes a bearer ID; and wherein, the context information of the EPS bearer reserved by the first module 141 further includes an SGW TEID and/or eNodeB information.

The second module 142 is configured to when the UE initiates an RRC connection in an IDLE state, carry an indication identity in an RRC connection request message, to indicate that the reserved bearer is used to transmit IP data.

In the present embodiment, the indication identity carried by the second module 142 in the RRC message is one or more of:

a bearer ID of the reserved bearer, an SGW TEID corresponding to the reserved bearer, and a small amount data transfer identity.

Alternatively, the second module 142 may further be configured to when the UE moves to a new eNodeB and initiates an RRC connection request, carry information of an old eNodeB in the RRC connection request.

In some other schemes, on the basis of the above UE, a third module 143 is added. The module is configured to when the UE receives the IP data transfer transmitted by an application program on the UE before initiating the RRC connection, judge that the reserved bearer can be used to transmit the IP data.

Embodiment Three

Figure 15:
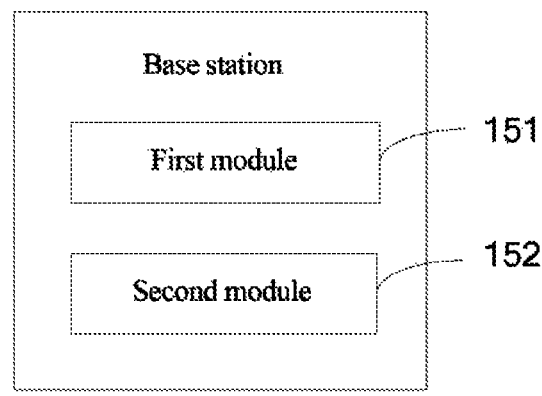
FIG. 15 is a structural diagram of a base station according to embodiment three of the present document.

The present embodiment provides a base station, and as shown in FIG. 15, the base station at least includes a first module 151 and a second module 152.

Wherein, the first module 151 is configured to when the UE enters an IDLE state, reserve context information of a radio access bearer marked with a bearer retain flag; and the second module 152 is configured to when an RRC connection request which is initiated by the UE in an IDLE state is received, return radio access bearer information to the UE according to the reserved context information of the radio access bearer.

It should be illustrated that the radio access bearer information returned by the base station to the UE should be more than instead of being less than the radio access bearer stored by the base station. Therefore, the second module 152 needs to add necessary information elements according to the stored context information, and then transmit the radio access bearer information after the add operation to the UE.

Embodiment Four

Figure 16:
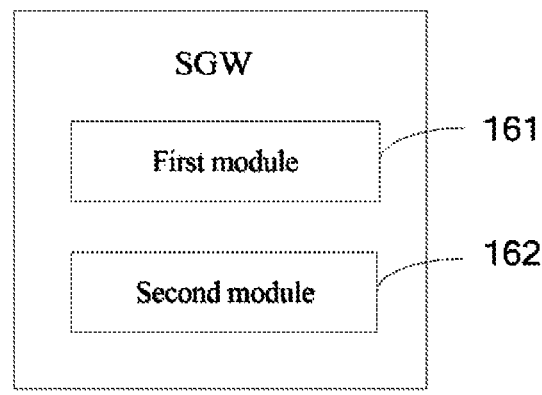
FIG. 16 is a structural diagram of a serving gateway according to embodiment four of the present document.

The present embodiment provides an SGW, and as shown in FIG. 16, the SGW at least includes a first module 161 and a second module 162.

The first module 161 is configured to when the UE enters an IDLE state, reserve context information of an EPS bearer marked with a bearer retain flag; and the second module 162 is configured to when IP data transmitted to the UE is received, if it is determined that the reserved bearer can be used to transmit the data, transmit the IP data to the UE through a base station using the bearer.

It should be illustrated that the method according to the embodiments of the present document is also applicable to a condition that the terminal is in Global System for Mobile Communications (GSM)/Enhanced Data rates for GSM Evolution (EDGE) Radio Access Network (GERAN)/Universal Terrestrial Radio Access Network (UTRAN) access. Correspondingly, a Serving GPRSSupportNode (SSGN) corresponds to the function of the MME, a Radio Network Controller (RNC)/NodeB corresponds to the function of the eNodeB, and a Gateway GPRS Support Node (GGSN) corresponds to the function of the SGW.

A person having ordinary skill in the art should understand that all or a part of the steps in the above method can be implemented by programs instructing related hardware, and the programs can be stored in a computer readable storage medium, such as a read-only memory, a disk, or a disc etc. Alternatively, all or a part of the steps in the aforementioned embodiments can also be implemented with one or more integrated circuits. Accordingly, various modules/units in the aforementioned embodiments can be implemented in a form of hardware, or can also be implemented in a form of software functional modules. The present application is not limited to any particular form of combination of hardware and software.

The above description is merely preferable examples of the present invention, instead of limiting the protection scope of the present document. Any modification, equivalent substitution, improvement etc., which is made within the spirit and principle of the embodiments of the present document, should be included in the protection scope of the appended claims of the present.

INDUSTRIAL APPLICABILITY

In the technical solutions according to the embodiments of the present invention, the signaling overhead due to recovery of bearers after the terminal enters a connected state from an IDLE state can be effectively reduced, and the consumption of the network resources can be reduced, thereby improving the capability of the network load.

What is claimed is:

1. A bearer allocation method, comprising:
when a network entity creates a bearer for a User Equipment (UE), if it is determined that the bearer has a bearer retain characteristic, marking a bearer retain flag in bearer context information; and
when the UE enters an IDLE state, an evolved base station and a Serving Gateway (SGW) to which the UE belongs reserving the bearer context information marked with the bearer retain flag; wherein
when the UE is in the IDLE state, transmitting and/or receiving Internet Protocol (IP) data using the bearer having the bearer retain flag.

2. The method according to claim 1, wherein, when any one or more of the following conditions are met, the network entity determines that the bearer has a bearer retain characteristic:
an Access Point Name (APN) corresponding to the bearer is an APN which is set to support a small amount data transfer or support bearer retain;
subscription data of the UE corresponding to the bearer marks that the UE has a small amount data transfer characteristic or has bearer retain requirements; and
a bearer create request initiated by the UE carries a small amount data transfer identity or a bearer retain flag.

3. The method according to claim 1, further comprising:
when the UE is in an IDLE state, if the SGW receives the IP data transmitted to the UE, the SGW transmitting the IP data using the bearer having the bearer retain flag.

4. The method according to claim 1, wherein,
the network entity marking a bearer retain flag in bearer context information comprises:
when a Mobility Management Entity (MME) of the network entity transmits a session create request or a session change request to the SGW, the network entity carrying the bearer retain flag in the request message to indicate that a created/modified Packet Data Network (PDN) connection and Evolved Packet System (EPS) bearer have bearer retain characteristics.

5. The method according to claim 4, further comprising:
the SGW returning a session create response or session change response to the MME, wherein the session create response or the session change response comprises an EPS bearer list, the EPS bearer list has bearers which are marked with bearer retain identities;

the MME transmitting an initial context request or a bearer setup request to the evolved base station, wherein, the initial context request or the bearer setup request comprises a radio access bearer list, which has bearers marked with bearer retain identities; or the MME transmitting a session create request or session change request to the UE, wherein, the session create request or the session change request comprises an EPS bearer list, which has bearers marked with bearer retain identities.

6. The method according to claim 1, wherein, when the UE enters an IDLE state, an evolved base station to which the UE belongs reserving the bearer context information marked with the bearer retain flag comprises:

the evolved base station reserving the context information of radio access bearers with bearer retain identities, wherein, the context information comprises a bearer identity (ID), an SGW address, and an SGW Tunnel Endpoint Identifier (TED).

7. The method according to claim 1, wherein, when the UE enters an IDLE state, an SGW to which the UE belongs reserving the bearer context information marked with the bearer retain flag comprises:

the SGW reserving the context information of EPS bearers with bearer retain identities, wherein, the context information comprises a bearer identity (ID), an evolved base station address, and an evolved base station TED.

8. The method according to claim 1, further comprising:

when the UE enters an IDLE state, the UE reserving the bearer context information with the bearer retain flag, wherein the context information comprises a bearer ID.

9. The method according to claim 6, wherein, the reserved bearer context information further comprises a bearer Quality of Service (QoS).

10. The method according to claim 8, wherein, the bearer context information reserved by the UE further comprises: SGW information and/or an evolved base station address, wherein the SGW information comprises the SGW address and the SGW TED.

11. A base station comprising hardware for executing instructions stored in a non-transitory computer readable medium to execute steps in:

a first module, configured to when a User Equipment (UE) enters an IDLE state, reserve context information of a radio access bearer marked with a bearer retain flag; and a second module, configured to when a Radio Resource Control (RRC) connection request which is initiated by the UE in an IDLE state is received, return radio access bearer information to the UE according to the reserved context information of the radio access bearer;

wherein when the UE is in the IDLE state, the second module is configured to transmit and/or receive Internet Protocol (IP) data using the bearer having the bearer retain flag.

12. The base station according to claim 11, wherein, the second module is configured to return the radio access bearer information to the UE according to the reserved context information of the radio access bearer by means of:

after adding necessary information elements according to the reserved context information of the radio access bearer, returning the radio access bearer information to the UE.

13. A Serving Gateway (SGW) comprising hardware for executing instructions stored in a non-transitory computer readable medium to execute steps in:

a first module, configured to when a User Equipment (UE) enters an IDLE state, reserve context information of an Evolved Packet System (EPS) bearer marked with a bearer retain flag; and a second module, configured to when Internet Protocol (IP) data transmitted to the UE is received, if it is determined that the reserved bearer can be used to transmit the data, transmit the IP data to the UE through a base station using the bearer;

wherein when the UE is in the IDLE state, the second module is configured to transmit and/or receive the IP data using the bearer having the bearer retain flag.

* * * * *